UNITED STATES PATENT OFFICE.

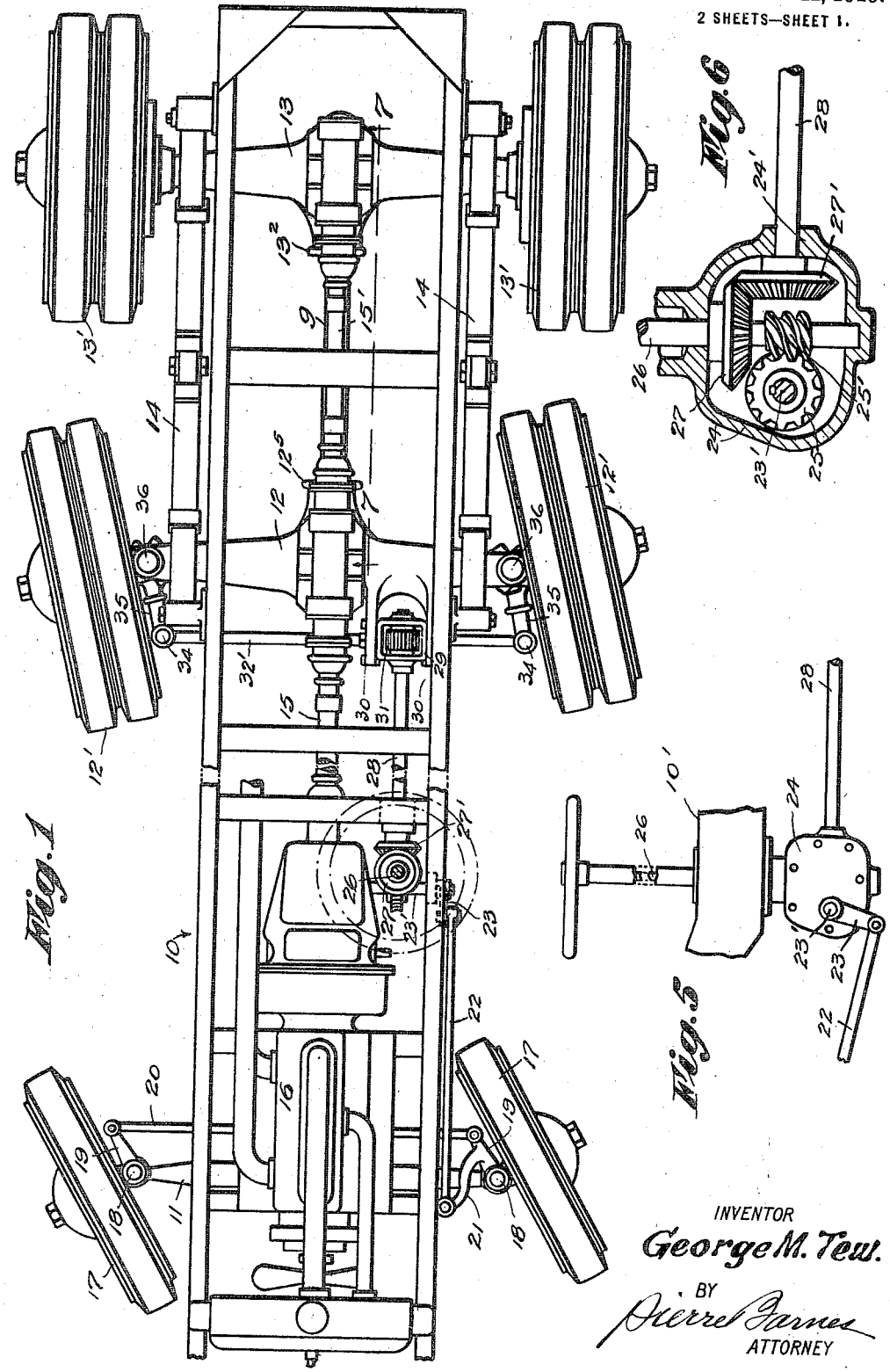

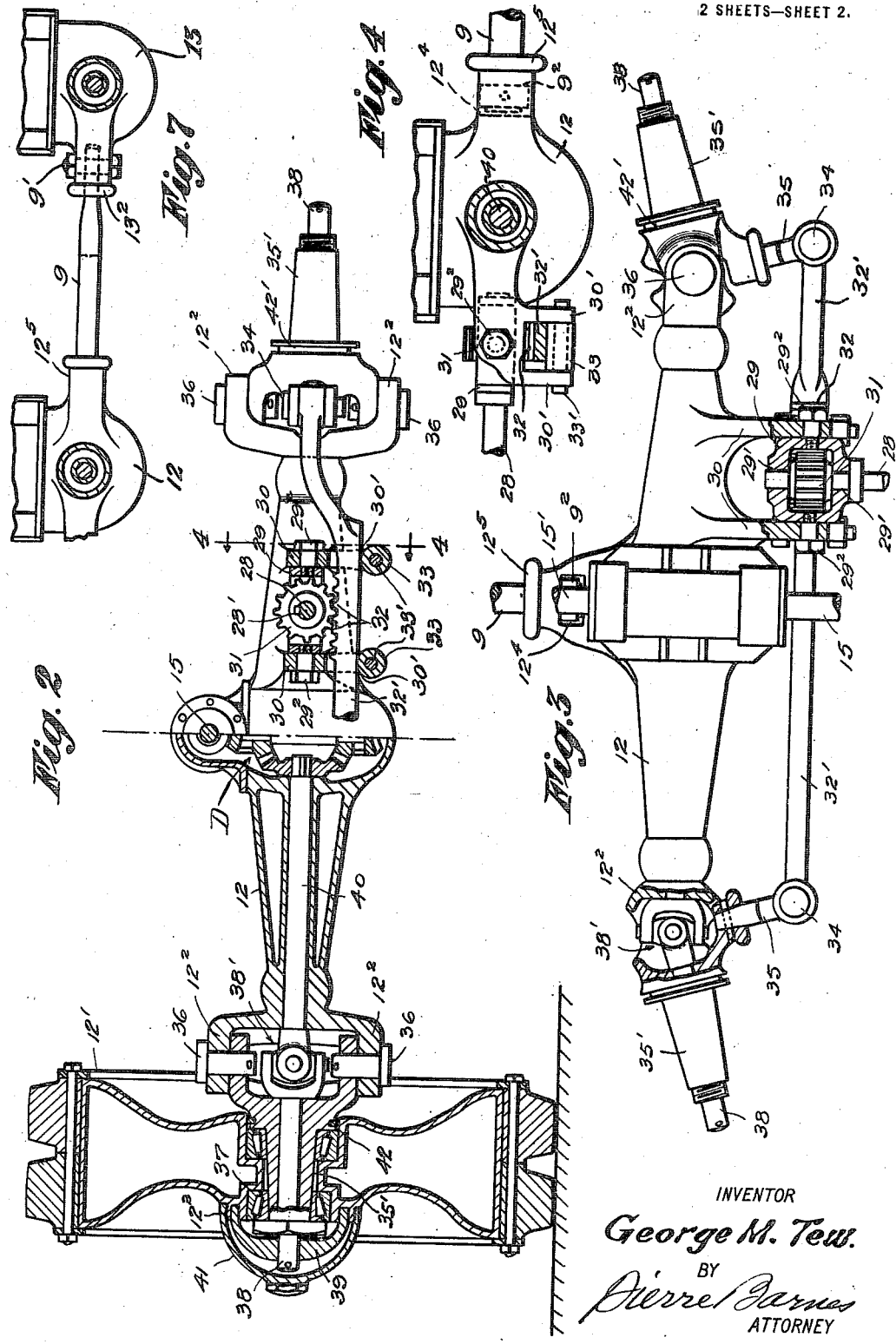

GEORGE M. TEW, OF KIRKLAND, WASHINGTON.

RUNNING-GEAR FOR AUTOMOBILES.

1,296,877.   Specification of Letters Patent.   Patented Mar. 11, 1919.

Application filed April 9, 1917. Serial No. 160,624.

*To all whom it may concern:*

Be it known that I, GEORGE M. TEW, a citizen of the United States, residing at Kirkland, in the county of King and State of Washington, have invented certain new and useful Improvements in Running-Gear for Automobiles, of which the following is a specification.

This invention relates to running gear for motor vehicles, particularly those of the heavy truck type. The object of the invention is to improve the construction and arrangement of running gears to improve their steering qualities, and to afford an increase of traction with a reduction in the tendency to skid.

The invention consists in the novel construction, adaptation and combination of parts, as will be hereinafter described and claimed.

The invention is illustrated as applied to a vehicle having six wheels, but it is to be understood that the number may be varied.

In the accompanying drawings, in which I show the preferred form of my invention, Figure 1 is a plan view of the chassis and the running gear of an auto truck. Fig. 2 is a view partly in front elevation and partly in transverse section of the axle and associated parts of the combined steering and driving wheels, one of said wheels being omitted. Fig. 3 is a plan view of the same with both wheels omitted and with parts shown in horizontal section. Fig. 4 is a section through 4—4 of Fig. 2. Fig. 5 is a fragmentary side elevational view to illustrate the steering wheel connections. Fig. 6 is a vertical longitudinal section through the gear case shown in Fig. 5. Fig. 7 is a fragmentary sectional view taken substantially through 7—7 of Fig. 1.

The reference numeral 10 designates the chassis of an auto truck which is mounted, as usual, upon a front axle 11 and, as in the present invention, upon the housings 12 and 13 of the rear divided axles for the rear or traction wheels $12^1$ and $13^1$. The chassis may be supported upon springs such as indicated by 14, and is connected with the front axle and said housings so that there is no relative horizontal angular movement there-between. To enable the four rear or traction wheels to bear simultaneously upon an uneven or winding road surface, the housings 12 and 13 are coupled beneath the power driven shaft $15^1$ by means of a reach rod 9 to afford a limited amount of flexibility; to which end the rod is hingedly connected by a pivotal pin $9^1$ to a boss $13^2$ of one of the housings and by a swivel joint with the other housing, as by securing a collar $9^2$ on the rod and within a recess $12^4$ of a boss $12^5$.

Said divided axles are operatively connected by ordinary or suitable differential gears such, for example, as indicated by D in Fig. 2, the same being driven by shafts 15, $15^1$ from a motor 16.

The forward wheels 17 are mounted on spindles which are attached by knuckle joints 18 to the ends of the axle 11, said spindles constituting arms of bell-crank levers whose other arms 19 are connected by the usual connecting rod 20 to operatively couple the two forward wheels.

One of said levers is provided with another arm 21 having connected thereto an end of a reach rod 22 whose other end is connected to a crank arm 23 (Fig. 5) of a transverse shaft $23^1$ which is journaled in a gear case 24 depending from the chassis member $10^1$, omitted from Fig. 1. Secured upon shaft $23^1$ is a toothed wheel 25 which is rotated by means of a worm $25^1$ provided on a steering post 26. The latter is also provided with a bevel gear 27 in mesh with a bevel gear $27^1$ provided on the forward end of a steering shaft 28 which is journaled in a bearing $24^1$ provided in said case. The steering shaft 28 extends rearwardly to, and is journaled in bearings $29^1$ of a hollow block 29 which is connected for oscillatory movements by trunnion bolts $29^2$ to bracket arms 30 extending forwardly from the axle housing 12.

Connected to the steering shaft 28 by a spline $28^1$ and located within the opening of said block is a spur pinion 31 which engages rack teeth 32 of a transversely arranged bar $32^1$ disposed below the pinion (Fig. 2) and slidable between spaced arms $30^1$ extending downwardly from the aforesaid bracket arms which, as shown in Figs. 2 and 4, support bar bearing rollers 33 by means of axles $33^1$. The ends of the bar $32^1$ are respectively connected by pins 34 with arms 35 of bell-crank levers whose other arms $35^1$ constitute the spindle bearings for wheels $12^1$ which serve for both steering and traction purposes. The last named levers are respectively fulcrumed to vertically alined pivotal pins 36 to bifurcations 12² formed on or provided at the ends of the housing 12.

As shown at the left side of Fig. 2, a wheel 12¹ is desirably provided with anti-friction roller bearings denoted by 37. Extending axially through the spindle 35 is a stub shaft 38 having its outer end rigidly connected by means of a collar 39 with the associated wheel by engaging in the hub 12³ thereof. The inner end of said stub shaft is connected by a universal joint, denoted by 38¹, with the outer end of one of the aforementioned divided axles 40.

41 represents detachable caps for the outer ends of the respective wheel hubs to exclude dirt from the bearings. The same function is performed with respect to the inner ends of the wheel hubs by packing rings 42, (see Fig. 2) provided in peripheral grooves provided for the respective spindle 35¹.

By reason of the construction and arrangement of the members of the aforedescribed steering mechanism, the forward wheels 17 and the traction wheels 12¹ adjacent thereto are simultaneously turned about the axes of their respective swivel connections 18 and 36 into desired steering directions. These steering adjustments of the wheels correspond as to direction, although the gearing included in the regulating connections between the two referred-to pairs of wheels is proportioned so that the angles to which the forward wheels 17 are adjusted is approximately twice that to which the wheels 12¹ are moved.

According to the present invention, the wheels 12¹ not only coöperate with the forward wheels 17 to steer the vehicle, but also serve to furnish lateral traction to cause the vehicle to move toward that side for which the steering wheels 17 are adjusted.

This function is an important one with heavy auto trucks as it enables them to be conveniently moved laterally to or from a curbing, freight platform, etc.

Further advantages of the invention reside in the means utilized for connecting the various wheels so that they may be controlled with a minimum amount of manual effort.

What I claim, is:—

The combination with the chassis, of a pair of traction wheels adjacent the rear end thereof, a pair of steering wheels at the forward end, a pair of steering and traction wheels intermediate the two aforesaid pairs of wheels, a steering post, independent connections between each pair of steerable wheels and said steering post, said connections with respect to the forward steering wheels including a worm gear, means for driving the two pairs of traction wheels, housings for both pairs of traction wheels, and a centrally disposed swiveled connection between said housings to afford relative oscillatory movements to the latter.

Signed at Seattle, Washington, this 27th day of March, 1817.

GEORGE M. TEW.

Witnesses:
  PIERRE BARNES,
  E. PETERSON.